(12) United States Patent
Krishnan et al.

(10) Patent No.: US 7,985,820 B2
(45) Date of Patent: Jul. 26, 2011

(54) NON-WATER SOLUBLE POLYMERIC SURFACTANTS

(75) Inventors: Ramasamy Krishnan, North Brunswick, NJ (US); Kenneth Smith, Saylorsburg, PA (US); Neil Young, Oakland, NJ (US); Inessa Gurevich, Fair Lawn, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 509 days.

(21) Appl. No.: 11/907,641

(22) Filed: Oct. 15, 2007

(65) Prior Publication Data
US 2008/0132675 A1 Jun. 5, 2008

Related U.S. Application Data

(60) Provisional application No. 60/829,413, filed on Oct. 13, 2006, provisional application No. 60/853,329, filed on Nov. 3, 2006.

(51) Int. Cl.
*C09F 1/04* (2006.01)
*C07C 231/02* (2006.01)

(52) U.S. Cl. ........ 527/600; 564/123; 564/133; 564/144; 554/219; 528/332

(58) Field of Classification Search .................. 527/600; 554/219; 564/123, 133, 144; 528/332
See application file for complete search history.

(56) References Cited

U.S. PATENT DOCUMENTS

| | | | |
|---|---|---|---|
| 2,893,886 A | 7/1959 | Erskine et al. | |
| 3,293,201 A | 12/1966 | Shahade et al. | |
| 3,629,119 A | 12/1971 | Weaver | |
| 3,719,623 A * | 3/1973 | Blank | 524/773 |
| 3,960,935 A | 6/1976 | Samour | |
| 4,428,855 A | 1/1984 | Law et al. | |
| 5,319,052 A | 6/1994 | Prantl et al. | |
| 5,417,749 A | 5/1995 | Krishnan et al. | |
| 5,800,599 A | 9/1998 | Asada | |
| 5,981,625 A | 11/1999 | Zou et al. | |
| 6,011,083 A | 1/2000 | Okuda et al. | |
| 6,149,720 A | 11/2000 | Asada et al. | |
| 6,348,519 B1 | 2/2002 | Ohshima et al. | |
| 6,544,322 B2 | 4/2003 | McCall et al. | |
| 6,709,503 B1 | 3/2004 | Krishnan et al. | |
| 6,858,678 B2 | 2/2005 | Andrist et al. | |
| 7,008,474 B2 | 3/2006 | Konno et al. | |
| 2002/0107309 A1 | 8/2002 | Malanga et al. | |
| 2004/0040468 A1 | 3/2004 | Nomura et al. | |
| 2004/0194658 A1 | 10/2004 | Konno et al. | |
| 2008/0139831 A1* | 6/2008 | Harui et al. | 554/219 |

FOREIGN PATENT DOCUMENTS

GB 2408050 A 5/2005
(Continued)

OTHER PUBLICATIONS

International Search Report and Written Opinion of the International Searching Authority issued for related PCT International application No. PCT/US07/22057; Mar. 3, 2008.

(Continued)

*Primary Examiner* — David Wu
*Assistant Examiner* — Vu A Nguyen
(74) *Attorney, Agent, or Firm* — McKenna Long & Aldridge LLP (57) ABSTRACT

A non-water soluble polymeric surfactant is prepared by reacting a polymerized/bodied unsaturated oil with maleic anhydride followed by a further partial or complete reaction with an amine to form an amide; or an alcohol to form an ester.

2 Claims, 7 Drawing Sheets

FOREIGN PATENT DOCUMENTS

| WO | 2004/058904 A1 | 7/2004 |
|---|---|---|
| WO | 2005/044934 A1 | 5/2005 |
| WO | WO 2005044934 A1 * | 5/2005 |
| WO | WO2005113694 A1 | 12/2005 |
| WO | WO 2006028649 A2 * | 3/2006 |

OTHER PUBLICATIONS

International Search Report and Written Opinion of the International Searching Authority issued for related PCT International application No. PCT/US07/22056; Feb. 25, 2008.

International Search Report and Written Opinion of the International Searching Authority issued for related PCT International application No. PCT/US07/81418; Mar. 7, 2008.

International Search Report and Written Opinion of the International Searching Authority issued for related PCT International application No. PCT/US07/81422; Mar. 7, 2008.

Office Action dated Jul. 22, 2009, U.S. Appl. No. 11/872,565, filed Oct. 15, 2007, Inventor Nobuo Harui.

Office Action dated Jul. 23, 2010, U.S. Appl. No. 11/872,565, filed Oct. 15, 2007, Inventor Nobuo Harui.

Office Action dated Sep. 29, 2009, U.S. Appl. No. 11/872,559, filed Oct. 15, 2007, Inventor Harui et al.

Office Action dated Nov. 2, 2010, U.S. Appl. No. 11/872,565, filed Oct. 15, 2007, Inventor Nobuo Harui, et al.

Office Action dated Sep. 29, 2010, U.S. Appl. No. 11/872,559, filed Oct. 15, 2007, Inventor Nobuo Harui, et al. (previously cited by applicant in Oct. 14, 2010 IDS as Office Action dated Sep. 29, 2009—typographical error).

* cited by examiner

NON-WATER SOLUBLE POLYMERIC SURFACTANTS

PRIOR APPLICATIONS

This application claims benefit of the U.S. provisional application Ser. No. 60/829,413, filed Oct. 13, 2006, and of the U.S. application Ser. No. 60/853,329, filed Nov. 3, 2006, the contents of which are incorporated herein by reference.

FIELD OF THE INVENTION

The invention relates to a non-water soluble polymeric surfactant that is used to stabilize emulsion heatset printing inks.

BACKGROUND OF THE INVENTION

Historically, lithographic web offset heat set inks contain between 30% and 45% volatile organic compounds (VOC). Besides being detrimental to the environment, VOCs are also flammable and hazardous to the printers who operate the press. Thus, it is desirable to reduce the VOC content in lithographic web offset heat set inks as much as possible. Initial attempts at solving this problem involved the use of chemical reactions that were triggered in a press oven. However, such oven cured ink systems did not have shelf stability.

Therefore, a heat setting web offset ink will typically contain the following major components (a) a high molecular weight ink resin to disperse the pigment and also to provide the toughness and gloss the ink requires on drying, (b) solvents to provide the fluidity to the ink before it is placed on the web and dried in an oven, (c) pigment, and (d) other minor components such as gellants, which provide structure to the ink, plasticizers (non volatile solvents), waxes, thickeners, and antioxidants. Conventional heatset inks set or dry by evaporation of the ink oil on heating at 250 to 300° F., and, to some degree, by penetration of the ink oil into the paper, leaving behind a hard polymeric film.

EP 731150 and EP 960911 describes rapid thermosetting low VOC web offset lithographic ink systems comprising solid resin, drying oil alkyds, bodied drying oil, vegetable oil, fatty acids, multifunctional unsaturated polyester, reducing agents and transition metal salts of organic acids and may also include an aqueous fountain solution containing peroxides that promote free radical polymerization of the ink.

WO 96/34922, U.S. Pat. No. 5,431,721, and U.S. Pat. No. 5,545,741, 1996 respectively describe lithographic inks which employ non-volatile solvents, but they set by penetration of the non-volatile solvent into the stock.

U.S. Pat. No. 7,018,453 describes a low VOC web offset heat set inks that contain a latex polymer. Due to its inherent incompatibility the gloss of printed film is dramatically reduced and at high speed piling occurs.

WO 2005/113694 describes an emulsion composition comprising water, a hydrocarbon distillate having a boiling point of 215 to 235° C., and a surfactant having a hydrophilic lipophilic balance number of 10 or less. However, the surfactant described in WO 2005/113694 is monomeric and the stability of the emulsified composition is not very good.

U.S. Pat. No. 5,417,749 describes a printing ink useful for "waterless" printing processes comprising a water-in-oil microemulsion wherein the water is present in an amount of about 5 to 20 wt. %, based on the weight of the ink. The water phase contains about 0.5 to 3 wt. %, based on the weight of the ink, of a water soluble surfactant which will not lower the surface tension (as measured at ambient temperature) of the ink.

In summary, traditional offset inks have high Volatile Organic Content (VOC) levels. The addition of water to the ink during manufacturing is one way to reduce the VOC level. However, prior attempts to emulsify water and reduce VOC content has been hampered by poor stability of the emulsified ink. Accordingly, there is a desire to develop better technology to stabilize pre-emulsified water in low VOC web offset heat set and offset inks that have good shelf stability and high dry speed.

SUMMARY OF THE INVENTION

The present invention provides a non-water soluble polymeric surfactant prepared by reacting a polymerized/bodied unsaturated oil with maleic anhydride followed by a further partial or complete reaction with:
(i) an amine to form an amide; or
(ii) an alcohol to form an ester.

Other objects and advantages of the present invention will become apparent from the following description and appended claims.

DETAILED DESCRIPTION OF THE INVENTION

It has been surprisingly discovered that incorporation of water via emulsions, in particular micro emulsions, enable reduction of VOCs by up to 50%. The micro emulsion was achieved with a novel polymeric surfactant.

This new class of non-water soluble polymeric surfactants promotes water-in-oil emulsion stability for pre-emulsified heatset and offset inks. Polymerized/bodied unsaturated oils are reacted with maleic anhydride (preferably 4-5 wt. %), and are subsequently reacted, partially or totally, with an amine or alcohol to form an amide or ester, respectively.

Preferably, the polymerized/bodied unsaturated oil is selected from the group consisting of linseed oil, polymerized linseed oil, soy oil, soy fatty acid ester, dehydrated castor fatty acid ester. Most preferably, the unsaturated oil is polymerized linseed oil.

Preferably, the amine is selected from the group consisting of ethanolamine, diethylamine, isobutylamine, octyleamine, morpholine, benzylamine and aniline. Also preferably, the alcohol is tridecylalcohol.

Preferably, the stabilized emulsion heatset printing ink of the present invention comprises water of more than 20% by weight, more preferably from about 5 to about 50% by weight, again more preferably from about 5 to about 20% by weight, and most preferably from about 5 to about 15% by weight.

Also preferably, a printing ink containing the polymeric surfactant of the present invention is a lithographic water-in-oil microemulsion printing ink having a viscosity between about 30 and about 300 poise and VOC content of less than about 35% by weight, more preferably less than about 20% by weight. The amount of non-water soluble polymeric surfactant present in the printing ink is preferably less than about 5% by weight, more preferably from about 1 to 3% by weight. Also preferably, the printing ink of the present invention does not contain a latex polymer.

The non-water soluble polymeric surfactant can be produced by the above mentioned procedure provided that any polymerized/bodied unsaturated oil is used and at least one of the following is used:
 1. A secondary monoamine or monoalcohol;
 2. A primary monoamine or monoalcohol;
 3. A cyclic secondary monoamine is used; or
 4. An aromatic primary monoamine or monoalcohol.

The addition of the non-water soluble polymeric surfactant has another advantage when used in letterpress inks. Letterpress inks are printed directly onto the paper, that is, neat inks are applied to the paper. The addition of water to the ink will absorb into the paper causing the paper fibers to swell. This swelling of the paper fibers affects the ink/paper interaction such that the printed image will appear smoother and sharper resembling offset printed inks. The purpose of the non-water soluble polymeric surfactant is to prevent the water from evaporating as the ink travels along the roller train.

Water Soluble Polymers

The printing ink containing the non-water soluble polymeric surfactant may optionally contain a water-soluble polymer. Examples of suitable modified polymers which are soluble in the water phase of the ink regardless of the pH of the water phase include: carboxymethylcellulose, hydroxyethylcellulose, hydroxypropyl-cellulose, hydroxybutylmethylcellulose, poly(C1,-C4) alkylene oxides, polyethyleneimine, polyvinyl alcohol, polyvinyl acetate, polyvinylpyrollidone, polyvinyl-oxazolidone and polyacrylamide polymers.

Gums is a class of widely used water-soluble polymers. Gums consist of polysaccharides with varying polymerization degrees. They include the polysaccharide hydrocolloids, which are usually prepared from gums, and they may have been chemically modified, e.g. by partial acetylation, to make them more water-soluble and/or stable in the presence of the other ingredients in the liquid media. Biopolymers also belonging to this class of polysaccharide hydrocolloids. Typical examples of commercially available, gum-type thickening agents are xanthan gums and their derivatives. These include a partially acetylated xanthan gum, KELZAN ex Kelco Company of N.J., USA, SHELLFLO-XA and ENOR-FLO-XA, xanthan gums ex Shell Chemicals Ltd., and Rhodapol, a xanthan gum ex Rhone-Poulenc SA. Another example is the biopolymer Shellflo S, a succinoglucan ex Shell Chemicals Ltd. Yet other gum-type thickening agents are those derived from guar gums, such as the JAGUAR(R) products ex Stein, Hall and Co Inc. Further we include Agent AT 2001, Rhodopol 23 and 23 P, Jaguar 8600 and 418 which have good solubility in water/solvent mixtures as well provided by Rhodia. Other types such as Jaguar 308 NB, Jaguar 2700, Jaguar 8000, Jaguar HP-120 are also included.

A further type of water soluble polymers are METHOCEL and ETHOCEL cellulose ether products. These are available in two basic types: methylcellulose and hydroxypropyl methylcellulose. Both METHOCEL types have the polymeric backbone of cellulose, a natural carbohydrate that contains a basic repeating structure of anhydroglucose units. During the manufacture of cellulose ethers, cellulose fibers are treated with methyl chloride, yielding the methyl ether of cellulose. These are METHOCEL A brand products. For hydroxypropyl methylcellulose products (METHOCEL E, F, J, and K brand products), propylene oxide is used in addition to methyl chloride to obtain hydroxypropyl substitution on the anhydroglucose units. This substituent group, —$OCH_2CH(OH)CH_3$-, contains a secondary hydroxyl on the number two carbon and may also be considered to form a propylene glycol ether of cellulose. These products possess varying ratios of hydroxypropyl and methyl substitution, a factor which influences organic solubility and the thermal gelation temperature of aqueous solutions.

ETHOCEL ethylcellulose polymers are derived from and have the polymeric "backbone" of cellulose, which is a naturally occurring polymer. The molecule has a structure of repeating anhydroglucose units. Note that each anhydroglucose unit (ring) has three reactive —OH (hydroxyl) sites. Cellulose is treated with an alkaline solution to produce alkali cellulose, which is subsequently reacted with ethyl chloride, yielding crude ethylcellulose. Specific properties of the various ETHOCEL polymers are determined by the number of anhydroglucose units in the polymer chain and the degree of ethoxyl substitution.

CELLOSIZE HEC polymers are named after their two components: cellulose and hydroxyethyl side chains. Cellulose itself is a water-insoluble, long-chain molecule consisting of repeating anhydroglucose units. In the manufacture of CELLOSIZE HEC, a purified cellulose is reacted with sodium hydroxide to produce a swollen alkali cellulose. This alkali-treated cellulose is more chemically reactive than cellulose. By reacting the alkali cellulose with ethylene oxide, a series of hydroxyethyl cellulose ethers is produced. In this reaction, the hydrogen atoms in the hydroxyl groups of cellulose are replaced by hydroxyethyl groups, which confer water solubility to the product.

Finally another group of well-known, suitable organic polymers, include acrylate homo- or copolymers and derivatives thereof. Typical examples of such materials which are suitably cross-linked are the acrylic copolymers sold by National Starch and Chemical Ltd under the trade names EP 1910 and PPE 1042 or Ultrasperse Starches. Other types of such (meth)acrylic homo- and copolymers are certain Carbopol(R)-type, cross-linked carboxyvinyl polymers such as CARBOPOL(R)-940 ex B. F. Goodrich Co Ltd. Other examples are the Viscalex products ex Allied Colloids, which are emulsions of (meth)acrylic acid copolymers with (meth) acrylate esters, e.g. VISCALEX HV 30, ACRYSOLS (ex Rohm & Haas) and UBATOLS (ex Stapol).

Evaluation of Non-Water Soluble Polymeric Surfactants by Shearing Followed by Visual Assessment Overtime The non-water soluble polymeric surfactants of the present invention were evaluated by shearing a weighed quantity of the polymeric surfactant in a jar using a mixer at high speed. A weighed quantity of water was then pipetted into the mixing solution and further sheared for 10 minutes. The emulsion was than transferred into a vial and capped. A visual assessment is made periodically for water/oil separation and color. The ratings of these sheared/mixed emulsions were based on whether the emulsion is stable for a least one week and the color. A whitish color has been determined to be more desirable due to the smaller particle size which provides a more stable emulsion. A non-water soluble polymeric surfactant is classified as excellent if there is no separation of the emulsion after one week and is white in color. A non-water soluble polymeric surfactant is classified as good if there is no separation of the emulsion after one week and is tan or brown in color. A non-water soluble polymeric surfactant is classified as acceptable if there is no separation of the emulsion after 3-5 days. Any separation that takes place in less than 3 days is considered poor.

Testing of Emulsified Ink Using Microscope

Emulsified ink (5 mg) was put on a slide glass, and another slide glass was piled on it. The ink was observed at a magnifying power of 450 and drops of water may be observed.

| | |
|---|---|
| Maximum diameter of drops is more than 13 micrometer | X not acceptable |
| Maximum diameter of drops is between 5 and 13 micrometer | Δ acceptable |
| Maximum diameter of drops is less than 5 micrometer | ○ good. |
| Almost no drops in the ink | ⊚ excellent |

Testing of Emulsified Ink Using Hoover Muller

Emulsified ink (1.0 g) was put on a Hoover Muller. At a weight of 1.1 kilogram, ink was milled for 100 rotations. Milled ink was scraped with a ink knife and the ink was observed as follows:

| | |
|---|---|
| A lot of water is separated | X not acceptable |
| Small drops of water are seen | Δ acceptable |
| Almost no drops of water are seen | ○ good |

Example 1

A non-water soluble polymeric surfactant was prepared by reacting polymerized linseed oil with maleic anhydride (4-5 wt. %) followed by a stoichiometric amount of diethylamine.

Example 2

Emulsified inks were prepared as indicated below in Table 1. The standard ink did not contain an emulsifier while the Experimental ink contained the polymeric surfactant as described in Example 1.

TABLE 1

| Component: | Standard ink: | Experimental ink: |
|---|---|---|
| Pigment flush | 30% | 30% |
| Offset varnish | 50% | 50% |
| Wax | 5% | 5% |
| Solvent | 5% | 4% |
| Water | 10% | 10% |
| Emulsifier | | 1% |
| | 100 | 100 |

The improvement in emulsion stability can be seen by a reduction in droplet size of emulsified water.

Example 2

Comparative

A heatset ink was formulated with conventional monomeric surfactant that create water in oil emulsion as follows:

| | |
|---|---|
| Modified phenolic resin solution | 33 |
| Clay | 10 |
| Pro Red | 31 |
| Microcrystalline wax | 4 |
| Linseed oil | 8 |
| Magie500 oil | 2 |
| Tergitol 15 s7 | 1 |
| Water | 11 |

The ink of Example 2 had poor ink water balance on a Didde web press at 1000 fpm.

Example 3

Three heatset inks were formulated with a polymeric surfactant prepared as described in Example 1. The three formulations (wohs yellow #1, wohs cyan and wohs magenta) are as follows:

Wohs Yellow #1

| | |
|---|---|
| Modified phenolic resin solution | 29 |
| Clay | 13 |
| Pro Yellow | 28 |
| Microcrystalline wax | 4 |
| Linseed oil | 6 |
| Magie500 oil | 7 |
| Texanol Isobutyrate | 1 |
| Polymeric Surfactant of Example 1 | 1 |
| Water | 11 |

Wohs Cyan

| | |
|---|---|
| Modified phenolic resin solution | 23 |
| Clay | 10 |
| Cyan Flush | 28 |
| Microcrystalline wax | 4 |
| Linseed oil | 5 |
| Magie 500 oil | 7 |
| Texanol Isobutyrate | 1 |
| Polymeric Surfactant of Example 1 | 2 |
| Water | 20 |

Wohs Magenta

| | |
|---|---|
| Modified phenolic resin solution | 33 |
| Clay | 10 |
| Red Flush | 31 |
| Microcrystalline wax | 4 |
| Linseed oil | 8 |
| Magie500 oil | 2 |
| Polymeric Surfactant of Example 1 | 1 |
| Water | 11 |

All three inks of Example 3 had good ink water balance on a Didde press at 1000 fpm. In addition the VOC levels were 30, 20 and 30% as compared to a 40% VOC for a non emulsified ink.

Example 4

Polymerized linseed oil (86.1 parts) was charged into a four-neck round bottom flask and heated to 205° C. under a nitrogen blanket. To this, maleic anhydride (4.1 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. and diethylamine (9.8 parts) was added over 90 minutes and held for one hour after the addition. After the one hour hold, the temperature was raised to 205° C. The batch was held at this temperature until there is a zero amine value and an acid value of 23-27. When the amine value was zero and the acid value 23-27, the batch was cooled to 140° C., then discharged.

The non-water soluble polymeric surfactant prepared was evaluated by shearing a weighed quantity of the polymeric surfactant in a jar using a mixer at high speed as described above. It produced good to excellent stable emulsions.

Example 5

Polymerized linseed oil (90.4 parts) was charged into a four-neck round bottom flask and heated to 205° C. under a nitrogen blanket. To this, maleic anhydride (4.1 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline was mixed. When a red color appeared, free maleic anhydride was present and the reaction was further held. When there was no color change, the reaction proceeded to the next step.

The batch was then cooled to 120° C. At 120° C., isobutylamine (5.5 parts) was added over 90 minutes and held for one hour after the addition. After the one hour hold, the temperature was raised to 205° C. The batch was held at this temperature until there was a zero amine value and an acid value of 23-27. When the amine value was zero and the acid value 23-27, the batch was cooled to 140° C., then discharged.

The non-water soluble polymeric surfactant prepared was evaluated by shearing a weighed quantity of the polymeric surfactant in a jar using a mixer at high speed as described above. It produced good to excellent stable emulsions.

Example 6

Polymerized linseed oil (91.7 parts) was charged into a four-neck round bottom flask and heated to 205° C. under a nitrogen blanket. To this, maleic anhydride (4.3 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. At 120° C., morpholine (4.0 parts) was added over 90 minutes and held for one hour after the addition. After the one hour hold, the temperature was raised to 205° C. The batch was held at this temperature until there is a zero amine value and an acid value of 23-27. When the amine value reached zero and the acid value 23-27, the batch was cooled to 140° C., then discharged.

The non-water soluble polymeric surfactant prepared was evaluated by shearing a weighed quantity of the polymeric surfactant in a jar using a mixer at high speed as described above. It produced good to excellent stable emulsions.

Example 7

Polymerized linseed oil (90.4 parts) was charged into a four-neck round bottom flask and heated to 205° C. under a nitrogen blanket. To this, maleic anhydride (4.1 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was cooled to 120° C. At 120° C., diethylamine (5.5 parts) was added over 90 minutes and held for one hour after the addition. After the one hour hold, the temperature was raised to 205° C. The batch was held at this temperature until there was a zero amine value and an acid value of 23-27. When the amine value was zero and the acid value is 23-27, the batch was cooled to 140° C., then discharged.

The non-water soluble polymeric surfactant prepared was evaluated by shearing a weighed quantity of the polymeric surfactant in a jar using a mixer at high speed as described above. It produced good to excellent stable emulsions. In addition, it has been field trialed in an ink and found to work quite well.

Example 8

Four color heat set inks were made as described in Table 2 below. All four inks were successfully lithographed on the Miehle sheetfed press and on the Didde web press.

TABLE 2

| Components | Black R3195-109-1 | Cyan R3195-108-2 | Magenta R3357-30 | Yellow R3357-32 |
|---|---|---|---|---|
| Heatset Vehicle 1 | 27 | | | |
| Clay compound 1 | 4 | | | |

TABLE 2-continued

| Components | Black R3195-109-1 | Cyan R3195-108-2 | Magenta R3357-30 | Yellow R3357-32 |
|---|---|---|---|---|
| Heatset vehicle 2 | | 40.5 | 31 | 37 |
| Clay compound 2 | | 10 | 10 | 10 |
| Wax 1 | 1 | | | |
| Wax 2 | | 5 | 5 | 5 |
| Black base 1 | 29 | | | |
| Black base 2 | 19 | | | |
| Cyan flush | | 22.5 | | |
| Magenta flush | | | 34 | |
| Yellow flush | | | | 24 |
| Lubricant 1 | 1 | | | |
| Non-water soluble polymeric surfactant prepared from Linseed/soya oils | 3 | 4 | 4 | 4 |
| Magie oil 1 | 3 | 6 | 6 | 10 |
| Magie oil 2 | 3 | | | |
| Tridecyl alcohol | | 2 | 0 | 0 |
| Water (with 3% starch) | 10 | 10 | 10 | 10 |
| Total | 100 | 100 | 100 | 100 |

The microemulsified inks of Example 8 were tested as described below and had: (1) Lithographic performance equal to commercial inks, (2) equal fountain solution consumption, (3) similar dot gains, (4) similar ink transfer, (5) similar ink feed back, ink consumption.

Ink and Fountain Solution Usage

Ink and fountain solution usage of the standard inks and the four experimental inks are described in Table 3 below.

TABLE 3

Ink and Fountain solution usage data

| | Black | Cyan | Magenta | Yellow | Fountain Solution | Total Imps. |
|---|---|---|---|---|---|---|
| Test 1 - Standard Inks | | | | | | |
| Make-ready Ink Consumption (lb/1000 sigs) | 0.45 | 0.55 | 0.69 | 0.73 | n/a | 23670 |
| Press run Ink Consumption (lb/1000 sigs) | 0.40 | 0.61 | 0.82 | 0.86 | 2.74 | 60,000 |
| Test 2 - Test Inks | | | | | | |
| Make-ready Ink Consumption (lb/1000 sigs) | n/a | n/a | n/a | n/a | n/a | n/a |
| Press run Ink Consumption (lb/1000 sigs) | 0.43 | 0.6 | 0.8 | 0.80 | 2.7 | 48,660 |

Dot Gain Values

Figure 1:
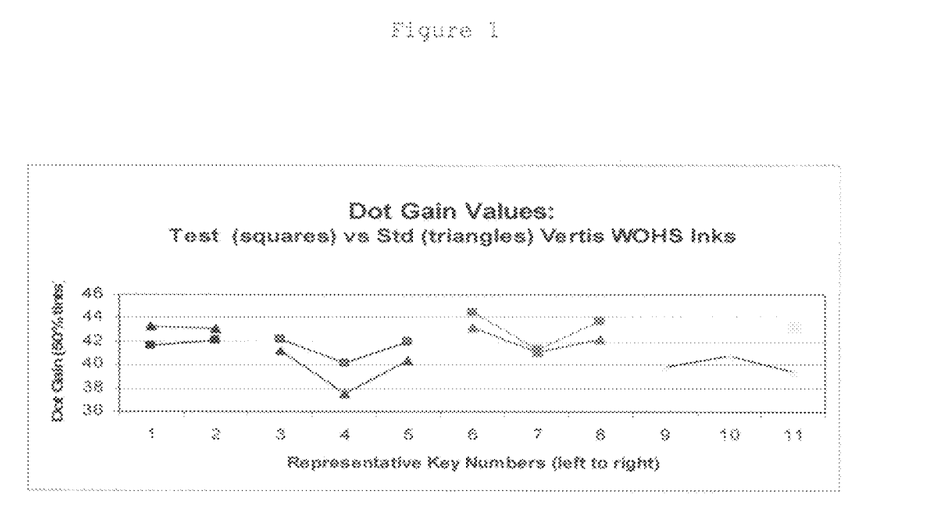
FIG. 1 shows dot gain values at 50% screens for the standard and new set of inks of Example 8. This proves that the printability of emulsion inks is equal to standard inks.

Dot gain values at 50% screens for the standard and new set of inks are presented in the graph below (FIG. 1). They were measured across the press keys as indicated by the numbers representative to the press keys in the graph. It is obvious that there are no significant differences between the two sets of inks (see FIG. 1).

Print Density Values

Figure 2:
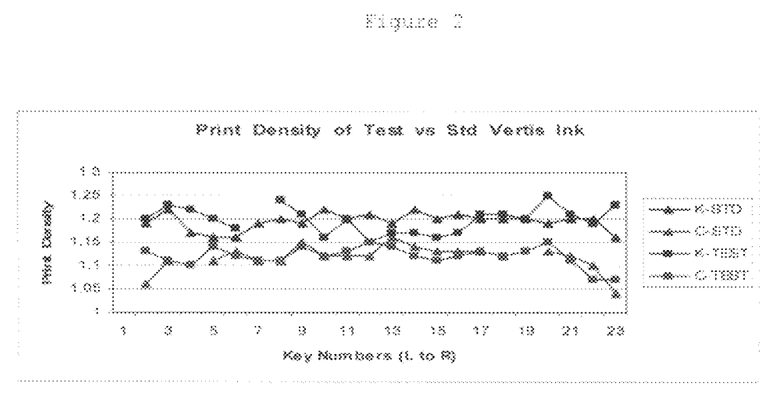
FIG. 2 shows print densities of the 2 Black and Cyan standard and experimental inks of Example 8 obtained across the keys of the press and plotted versus the densities of the standard set of inks. This proves that the runnability of emulsion inks is equal to standard inks.
Figure 3:
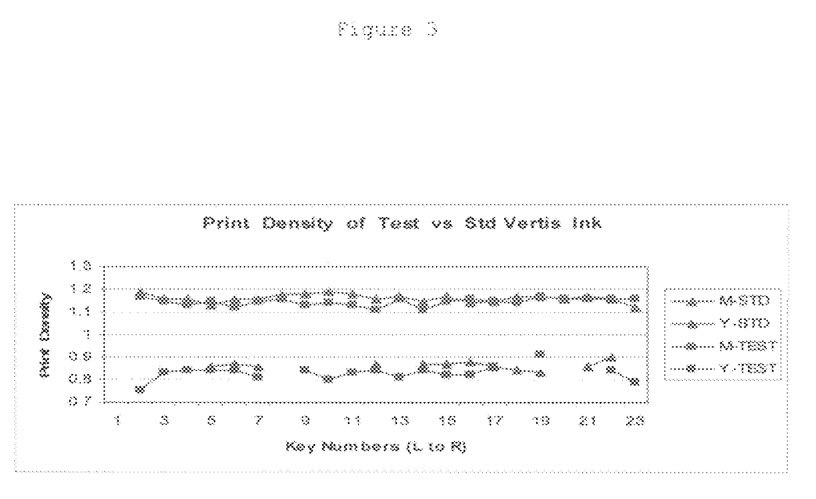
FIG. 3 shows print densities of 2 Magenta and Yellow standard and experimental inks of Example 8 obtained across the keys of the press and plotted versus the densities of the standard set of inks. This proves that the runnability of emulsion inks is equal to standard inks.
Figure 4:
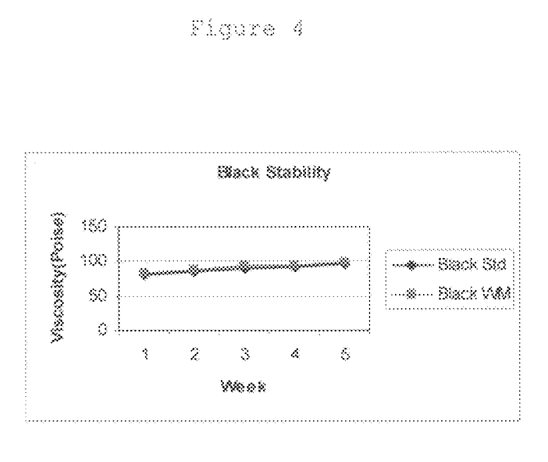
FIG. 4 shows High shear viscosity as measured by Duke Viscometer at 2,500 $s^{-1}$ versus time for the Black standard and experimental inks (WM) of Example 8. This proves that the experimental inks are equally stable with time at high shear rates.
Figure 5:
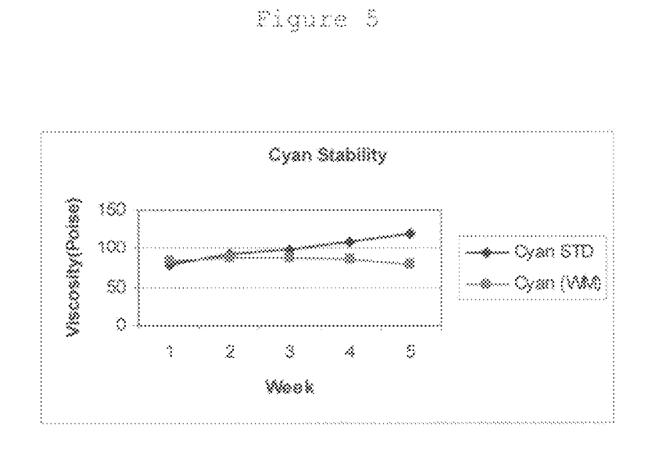
FIG. 5 shows High shear viscosity as measured by Duke Viscometer at 2,500 $s^{-1}$ versus time for the Cyan standard and experimental inks of Example 8. This proves that the experimental inks are equally stable with time at high shear rates.
Figure 6:
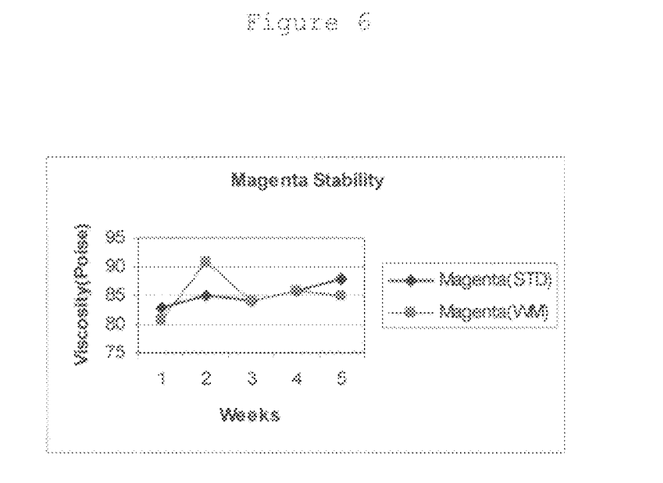
FIG. 6 shows High shear viscosity as measured by Duke Viscometer at 2,500 $s^{-1}$ versus time for the Magenta standard and experimental inks of Example 8. This proves that the experimental inks are equally stable with time at high shear rates.
Figure 7:
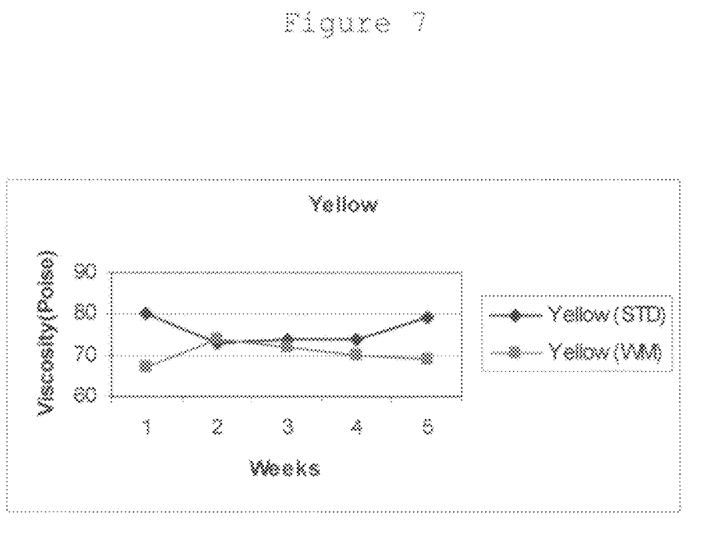
FIG. 7 shows High shear viscosity as measured by Duke Viscometer at 2,500 $s^{-1}$ versus time for the Yellow standard and experimental inks of Example 8. This proves that the experimental inks are equally stable with time at high shear rates.

Print densities were also obtained across the keys of the press and they are plotted below versus the densities of the standard set of inks (FIGS. 2 and 3). In fact the key settings were set by the standard set of inks and the new set was run under the same settings. It is obvious that there is no difference in the print densities between the same colors from the two sets of inks (see FIGS. 2 and 3).

Rheological Stability

These tests were carried out under alternative freeze-thaw (0° C.) and hot oven (40° C.) conditions for several weeks. A standard ink sample was used as a reference under the same conditions. High shear viscosity was measured by Duke Viscometer at 2,500 s$^{-1}$. Black, Magenta and Yellow inks show similar behavior with the standard. The new Cyan stability appears to be better than that of the standard (see FIGS. 4-7).

Example 9

A heatset ink was formulated as indicated below with a polymeric surfactant prepared as described in Example 1:

Wohs Yellow

| Modified phenolic resin solution | 23 |
|---|---|
| Clay | 10 |
| Yellow Flush | 28 |
| Microcrystalline wax | 4 |
| Linseed oil | 5 |
| Magie500 oil | 7 |
| Texanol Isobutyrate | 1 |
| Polymeric surfactant of Example 1 | 2 |
| Water | 20 |

The volatile organic content of the above ink was 20% which is a reduction of 50% as compared with 40% VOC in a standard ink.

The invention has been described in terms of preferred embodiments thereof, but is more broadly applicable as will be understood by those skilled in the art. The scope of the invention is only limited by the following claims.

What is claimed is:

1. A non-water soluble polymeric surfactant prepared by
    (a) reacting, with heating, a polymerized/bodied unsaturated oil with 4-5 wt % maleic anhydride until no free maleic anhydride is present;
    (b) cooling the mixture of (a);
    (c) adding morpholine to the mixture of (b);
    (d) holding the mixture of (c) for one hour;
    (e) heating the mixture of (d) until reaching a zero amine value and a 23-27 acid value;
    (f) cooling the mixture of (e),
wherein said non-water soluble polymeric surfactant improves emulsion stability by reducing droplet size of emulsified water in an emulsion heatset ink comprising the non-water soluble polymeric surfactant.

2. The polymeric surfactant of claim 1, wherein said polymerized/bodied unsaturated oil is selected from the group consisting of linseed oil, polymerized linseed oil, soy oil, soy fatty acid ester, dehydrated castor fatty acid ester.

* * * * *